Dec. 30, 1969 R. J. LEWIS 3,486,798
SPACER FOR DUAL WHEEL RIMS
Filed April 26, 1968 2 Sheets-Sheet 1

INVENTOR.
RICHARD J. LEWIS
BY
ATTORNEY

Dec. 30, 1969  R. J. LEWIS  3,486,798
SPACER FOR DUAL WHEEL RIMS
Filed April 26, 1968  2 Sheets-Sheet 2

INVENTOR.
RICHARD J. LEWIS
BY
ATTORNEY

United States Patent Office 3,486,798
Patented Dec. 30, 1969

3,486,798
SPACER FOR DUAL WHEEL RIMS
Richard J. Lewis, Uniontown, Ohio, assignor to The Goodyear Tire & Rubber Company, Akron, Ohio, a corporation of Ohio
Filed Apr. 26, 1968, Ser. No. 724,425
Int. Cl. B60b 21/00
U.S. Cl. 301—13                                    4 Claims

ABSTRACT OF THE DISCLOSURE

A spacer ring to separate a pair of wheel rims on a dual rim vehicle wheel. The spacer is an annular body member having a plurality of uniform radial corrugations formed by one group of ribs extending from one marginal edge past the circumferential midpoint of the body member and another group of ribs extending from the opposite marginal edge past the circumferential midpoint of the body member. Both sets of ribs are located with respect to each other in such manner as to form a continuous zigzag depressed portion extending around the circumference of the body member with the zigzag depressed portions extending from margin to margin.

---

This invention relates to a spacer ring for use between the rims of a dual rim wheel.

PRIOR ART

The closest prior art known to the applicant is U.S. Patent No. 2,100,626, issued to W. S. Brink and U.S. Patent No. 3,143,376, issued to M. A. DiFederico. In the past, various types of spacer rings have been devised to axially separate dual wheel rims from each other. Although variations of designs have been used for rings of this type, they have not been entirely satisfactory, either because they were not sufficiently strong in the axial direction to resist the axial crushing force of the adjacent wheel rims against each marginal edge or because they did not have sufficient hoop strength and after a certain period of use, problems of cording would develop and the ring would become loose on the base or felloe of the vehicle wheel and would not properly retain the wheel rims in the desired space relationship to each other.

OBJECTS OF THE INVENTION

It is the primary object of this invention to overcome the difficulties of the prior art devices by providing a dual wheel spacer ring which has improved hoop strength and which is sufficiently reinforced to withstand the axial crushing force of the adjacent wheel rims on each marginal edge thereof.

Another object of this invention is to provide a spacer ring in which cording will not occur.

These and other objects of the invention will become more fully apparent as the description proceeds in the following specification and the appended drawings.

DESCRIPTION OF THE PREFERRED EMBODIMENTS

Figure 1:
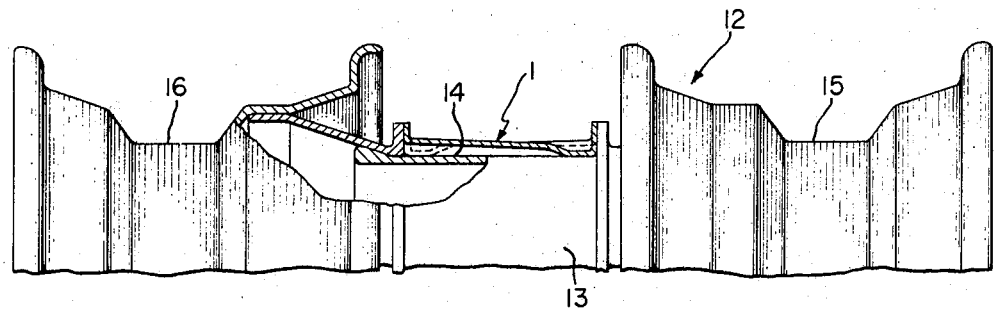
FIGURE 1 is a fragmentary view, partly broken away and in section, of a vehicle wheel having dual tire rims mounted thereon, with the spacer of the invention positioned between the rims.

Referring now to FIGURE 1 of the drawings, the spacer ring indicated by the numeral 1 is mounted on a vehicle wheel and rim assembly 12 comprising a wheel 13 having a seat 14 upon which rims 15 and 16 are mounted with the spacer 1 therebetween. The manner in which spacer rings of this type are mounted on wheel bases or felloes is well-known in the prior art as shown in the two previously mentioned references, U.S. Patent 2,100,626 or U.S. Patent 3,143,376.

Figure 2:
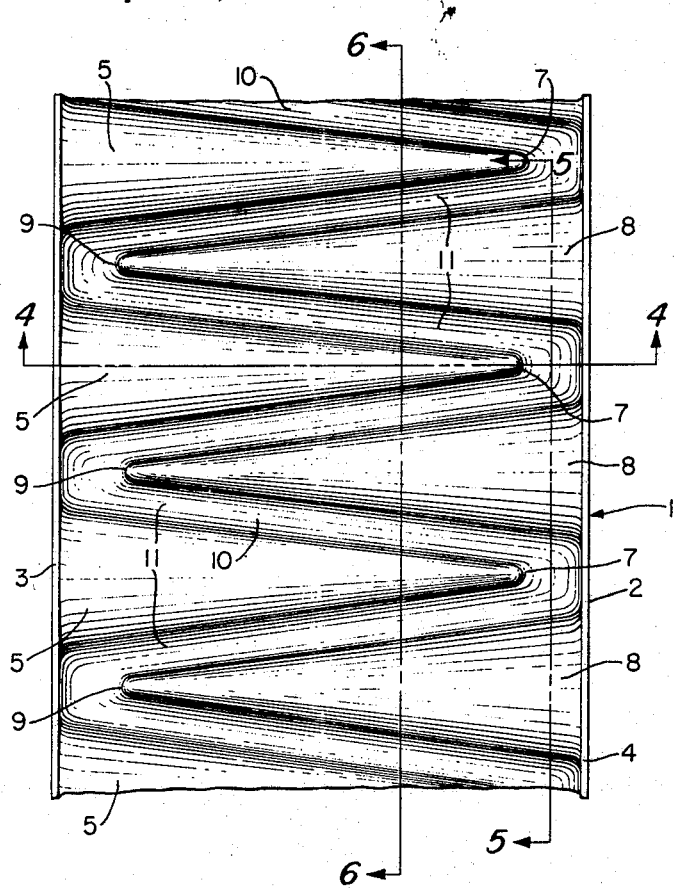
FIGURE 2 is an enlarged fragmentary plan view of the spacer shown in FIGURE 1.
Figure 3:
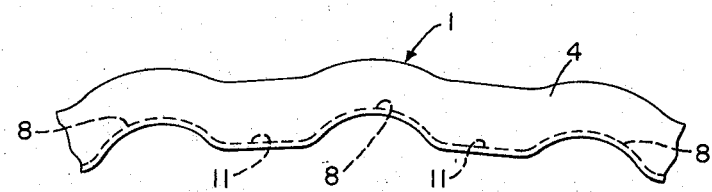
FIGURE 3 is an enlarged fragmentary side elevation view of the spacer of FIGURE 1.

Referring now to FIGURE 2 of the drawings, the spacer ring 1 is comprised of a single endless annular body member 2 preferably stamped of steel or other suitable metal or other material. The body member 2 has a radially outwardly extending circumferential flange 3 on one marginal edge and a similar flange 4 on the opposite marginal edge. One set of uniformly spaced radial ribs 5 extend axially inwardly from the flange 3 and decrease in width from the widest portion adjacent the flange 3 until they reach a termination point 7 which is located axially inwardly from the opposite flange 4. A second set of similarly tapered ribs 8 extending axially inwardly from the flange 4 and stops at a termination point 9 which is axially inwardly from the flange 3. The ribs 5 and the ribs 8 are circumferentially staggered or offset from each other in such manner that part of each rib extends between a pair of adjacent ribs and the overall pattern of ribs around the circumference of the body member 2 forms a continuous zigzag depressed portion 10 which extends back and forth between the flanges 3 and 4 at the marginal edges of the body member 2 and with each individual segment 11 of the depressed portion 10 being inclined at an angle with respect to the axis of the spacer ring 1. The angle of inclination of the segments 11 is determined, of course, by the amount of taper on the ribs 5 and 8 so that the more that the ribs are tapered, the greater will be the angle of inclination of the segments 11. The combination of the tapered ribs and the manner in which they extend between each pair of adjacent ribs across the midpoint 6 and the angle of inclination of the depressed segments 11 all contribute to the increased hoop strength and axial strength of the spacer ring. In addition, the particular rib pattern resists twisting or warping of the spacer ring 1 and insures better concentricity of the ring 1.

Figure 5:
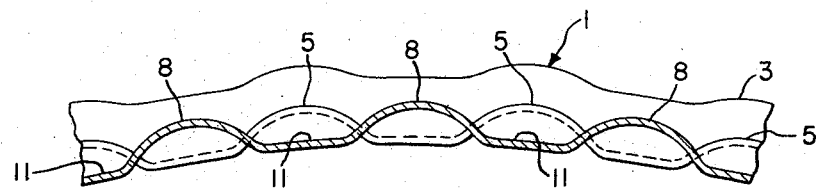
FIGURE 5 is a cross-sectional view taken along line 5—5 of FIGURE 2.
Figure 6:
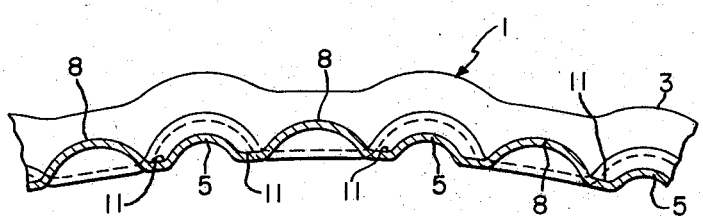
FIGURE 6 is a cross-sectional view taken along line 6—6 of FIGURE 2.
Figure 4:
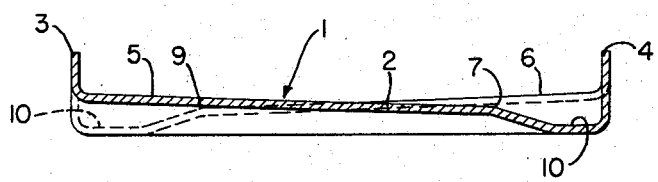
FIGURE 4 is a cross-sectional view taken along line 4—4 of FIGURE 2.

Referring now to FIGURES 4 through 6, the overall contour of the ribs and depressed segments can be more clearly seen. In FIGURE 4, one can readily see the manner in which one of the ribs 5 longitudinally overlaps one of the ribs 6 and how each of the ribs tapers to its respective termination point 7 and 9.

FIGURE 6 particularly emphasizes the difference in the size of the ribs from one portion of the rib to another. In FIGURE 6, the ribs 8 are shown in section in a wider portion of the rib and the ribs 5 are shown in section in a narrow portion of the rib. This provides an undulating cross-sectional pattern in which every other rib has a wide portion adjacent a narrow portion of the next adjacent rib.

It will be understood, of course, that minor deviations in proportion of the ribs and depressed segments, minor changes in angle of inclination and in rib taper, and minor differences in rib depth may be made without departing from the scope of the invention. One of the main criteria of the present invention is that the opposed ribs extend past the circumferential mid point of the spacer ring but terminate before reaching completely across the width of the ring.

Various changes can be made in the illustrative embodiments shown herein without departing from the scope of the invention.

What is claimed is:

1. A spacer for separating a pair of rims on a vehicle wheel comprising an annular body member having:
   (A) a plurality of uniform radial corrugations forming alternately raised tapered ribs and depressed intermediate portions between each pair of adjacent ribs;
   (B) a first group of said ribs extending from a first margin substantially to but terminating short of an opposite second margin;
   (C) a second group of ribs extending from the second margin substantially to but terminating short of the first margin;
   (D) the depressed intermediate portions of the body forming a continuous zigzag depression around the entire circumference of the body running transversely back and forth from margin to margin; and
   (E) an integral circumferential radially outwardly extending flange on each marginal edge thereof.

2. A spacer as claimed in claim 1 wherein each of the ribs is widest at the end adjacent the margin from which it extends and progressively decreases in width toward the opposite end thereof.

3. A spacer as claimed in claim 1 wherein the depressed intermediate portions extend transversely across the body member at an inclined angle to the axis thereof.

4. A spacer as claimed in claim 3 wherein half of the depressed portions are inclined in one direction and the other half are inclined in the opposite direction.

References Cited

UNITED STATES PATENTS

| | | | |
|---|---|---|---|
| 2,100,626 | 11/1937 | Brink | 301—13 |
| 2,521,260 | 9/1950 | Sinclair | 301—13 |
| 3,143,376 | 8/1964 | Federico. | |
| 3,421,797 | 1/1969 | Walther. | |

RICHARD J. JOHNSON, Primary Examiner